J. F. MALLINCKRODT,

Assignor, by mesne assignments, to THE MALLINCKRODT BRAKE COMPANY.

CAR BRAKE.

No. 10,318. Reissued Apr. 24, 1883.

WITNESSES

E. D. Nottingham.

Herman Moran.

INVENTOR

John F. Mallinckrodt.

By H. A. Seymour.

ATTORNEY

N. PETERS, Photo-Lithographer, Washington, D. C.

UNITED STATES PATENT OFFICE.

JOHN F. MALLINCKRODT, OF DENVER, COLORADO, ASSIGNOR, BY MESNE ASSIGNMENTS, TO THE MALLINCKRODT BRAKE COMPANY, OF EAST ST. LOUIS, ILLINOIS.

CAR-BRAKE.

SPECIFICATION forming part of Reissued Letters Patent No. 10,318, dated April 24, 1883.

Original No. 240,033, dated April 12, 1881. Application for reissue filed November 9, 1882.

*To all whom it may concern:*

Be it known that I, JOHN F. MALLINCKRODT, a citizen of the United States, residing at Denver, in the county of Arapahoe and State of Colorado, have invented certain new and useful Improvements in Automatic Railway-Brakes; and I do hereby declare that the following is a full, clear, and exact description of the invention, which will enable others skilled in the art to which it appertains to make and use the same, reference being had to the accompanying drawings, which form a part of this specification, and in which—

Figure 1:
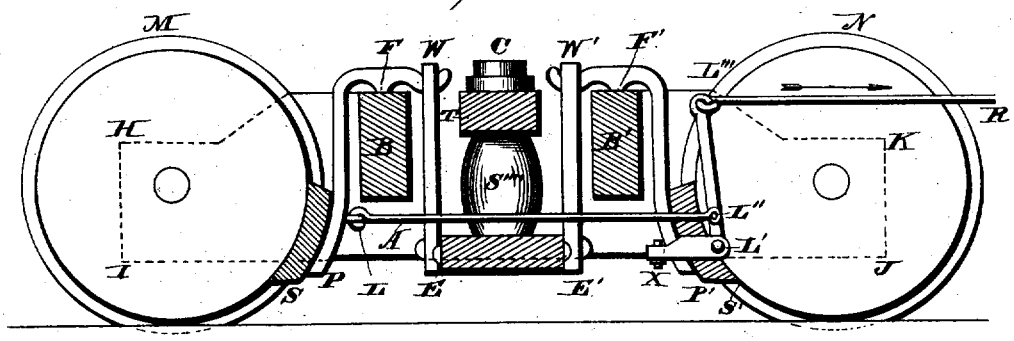
Figure 2:
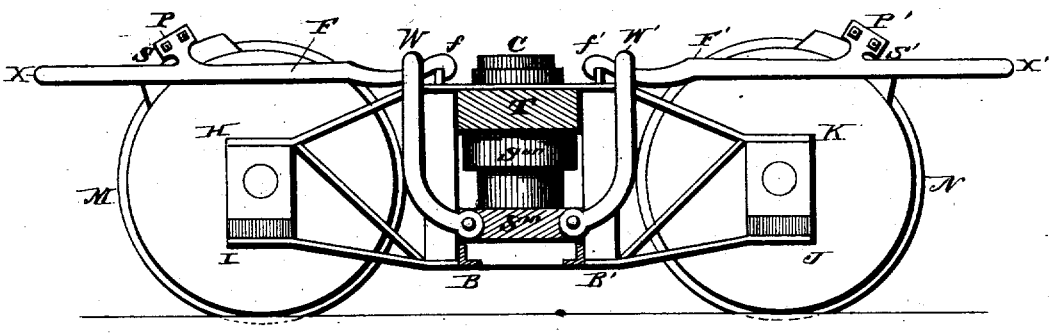

Figure 1 represents a longitudinal vertical section of a railway-car truck in which is shown the arrangement and combination of levers of the first class (fulcrum between the weight and the power) as applied to my invention, and Fig. 2 is a similar view of a truck in which is shown the arrangement and combination of levers of the second class (weight between the fulcrum and the power) as applied to my invention.

My invention has relation to automatic brakes for railway-cars; and it consists in the combination, with the truck and truck-wheels, of a system of levers, either of the first or second class, adapted to set the brakes by the weight of the car-body and its load, substantially as hereinafter more fully described.

Referring to Fig. 1 of the drawings, the letters H I J K represent one side of a truck-frame, (shown partially in dotted lines,) and M N the wheels.

B and B′ are cross-beams, upon which are bolted saddles carrying respectively the fulcrums of levers W F P and W′ F′ P′. At the lower ends of these levers (marked respectively P and P′) are attached the brake-shoes S and S′. The lower part of lever W F P (to the left in the drawings) has a lug, L, with an eye, into which is hooked a rod, A, which passes under the cross-beams B B′, and is connected to the lower end of a lever, L‴, at the point marked L″. Below this point the lever L‴ is pivoted to a "swallow fork," L′, the other end of which is connected to a bar, X, which is attached to the right lever, W′ F′ P′. In the upper end of the lever L‴ is hooked a rod, R.

A section of the spring-board is shown at S‴, and S⁗ represents the spring.

T is the transom, and C is the center plate resting thereon.

E and E′ are hangers or stirrups, which connect respectively the upper hooked ends of levers W F P and W′ F′ P′ with opposite sides of the spring-board S‴.

The operation of this mechanism is as follows: The weight of the body of the car, resting on the center plate, C, will force the outer ends of the levers W F P W′ F′ P′, with their brake-shoes, against the wheels by tilting the levers upon their respective seats or saddles on the cross-beams B B′. Thus the brakes are always set, except when the upper rod, R, is pulled in the direction of the arrow, which has the effect of releasing both the brake-shoes S′ S from the wheels through the intervening lever L‴, swallow fork L′, and connecting-rod A, it being obvious that the pulling force on R must be sufficient to overcome the downward pressure exerted by the weight of the car.

The power required to operate rod R may conveniently be applied by means of a direct air-pressure, as used in operating the so-called "Westinghouse freight-brakes," or by the application of atmospheric pressure as used in the operation of vacuum-brakes. In both cases the hose-connections between the cars must of course be fitted with couplings that will permit of the instant escape of the air by which rod R is operated when the connections are uncoupled or torn apart.

From the foregoing it will be seen that in case one or more of the cars should become accidentally detached from the rest of the train, no matter what is the nature of the power used to operate rod R to keep off the brakes, these are instantly clapped on the wheels; and it is also plain that in case the pulling force on rod R is intentionally stopped the brakes will be instantly set on every car in the train. If the release of the brakes is again desired, the operating power or pressure must be restored in connection with rod R.

The amount of pressure on the brake-shoes can be proportioned by the relative distances between the fulcrums F and F′ from the ends of their respective levers. In determining these distances I make my calculations from the weight of the body of an empty car, so that only enough pressure is thrown on the brake-shoes to stop the car on the average grade of the road without sliding the wheels. Now, having once proportioned the leverage to the weight of the car, it will be seen that this proportion is constant—that is, it remains the same whether much or little is loaded on the car. If an empty car-body weighs, say, five tons, and a load of five tons is placed upon the car, the brake-pressure will be twice as great as it was when the car was empty; and this is proper, and constitutes one of the chief advantages of my invention. Another advantage is that the leverage having once been correctly fixed, there is no danger of sliding or flattening the wheels, no matter how large or how small the load.

The hand-brake rod and wheel system used heretofore for setting the brakes I use in my construction for effecting their release, and it is plain that careless brakemen cannot flatten the wheels, as is frequently the case on the old-fashioned hand-brakes.

In Fig. 2 of the drawings I have shown a modified construction of my invention, the modification consisting simply in the substitution of levers of the second class (with the weight between the fulcrum and the power) for levers of the first-class, (with the fulcrum between the weight and the power.) This substitution requires some changes in the arrangement of the operating parts, which I shall now proceed to describe.

The letters H I J K represent the truck-frame, and M N the wheels.

F and F′ are the levers, which have their fulcrums, respectively, at *f f′* upon the cross-beams B B′. Each of the levers F F′ is made with a T-shaped arm, P P′, upon which the brake-shoes (denoted by S S′) are secured.

C is the center plate; T, the transom; S′′′′, the spring, and S′′′ the spring-board, which is connected by the hangers W and W′ to the inner ends of levers F F′.

The stays or cross-beams B B′ serve as guides for the movable middle part of the truck-frame, and it follows that the brakes are always set, (by the weight of the car-body resting upon the center plate, C,) except when a lifting force is applied to the outer ends of levers F F′, (marked respectively X and X′.) This force may be applied by means of direct air-pressure, or by atmospheric pressure, in like manner as described in describing the operation of the mechanism shown in Fig. 1.

I am aware that in a car-brake mechanism a vertically-moving bolster has been so connected with the brake-levers that the raising of said bolster causes the brakes to be applied to the car-wheels, and I lay no claim to such mechanism.

Having thus described my invention, I claim and desire to secure by Letters Patent of the United States—

1. The combination, with a vertically-movable bolster and spring-board connected therewith, of brake-levers provided with brake-shoes, stirrups connected at their lower ends with the spring-board, and at their upper ends with the brake-levers, and brake rods and levers for taking off the brakes in opposition to the weight of the cars, substantially as set forth.

2. The combination, with a vertically-movable bolster, spring-board connected therewith, and truck cross-beams located each side of the bolster, of brake-levers having brake-shoes connected with their long arms, and stirrups located between the bolster and cross-beams, the lower ends of the stirrups being connected with the spring-board and their upper ends with the short arms of the brake-levers, substantially as set forth.

3. The combination, with a vertically-movable bolster and spring-board connected therewith, of brake mechanism connected with the spring-board and adapted to be set by the weight of the car transmitted through the spring-board, substantially as set forth.

4. The combination, with a vertically-movable bolster, spring-board connected therewith, and cross-beams located on opposite sides of the bolster, of brake-levers having their short arms supported by the cross-beams and their long arms provided with brake-shoes and stirrups connected at their lower ends with the spring-board and at their upper ends with the short arms of the brake-levers, substantially as set forth.

JOHN F. MALLINCKRODT.

Witnesses:
HERMAN MORAN,
GEO. D. SEYMOUR.